United States Patent
Ding et al.

(10) Patent No.: US 12,153,819 B2
(45) Date of Patent: Nov. 26, 2024

(54) MULTI-DIMENSIONAL DATA RECOVERY

(71) Applicant: INTERNATIONAL BUSINESS MACHINES CORPORATION, Armonk, NY (US)

(72) Inventors: Ning Ding, Shanghai (CN); Bo Zou, Urumqi (CN); Yang Liu, Shanghai (CN); Cheng Yong Zhao, Shanghai (CN); Yongjie Gong, Shanghai (CN); Xiao Qin Li, Shanghai (CN); Dan Dan Wang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 378 days.

(21) Appl. No.: 17/111,498

(22) Filed: Dec. 3, 2020

(65) Prior Publication Data
US 2022/0179557 A1    Jun. 9, 2022

(51) Int. Cl.
*G06F 3/06* (2006.01)

(52) U.S. Cl.
CPC ............ *G06F 3/065* (2013.01); *G06F 3/0619* (2013.01); *G06F 3/0673* (2013.01)

(58) Field of Classification Search
CPC ....... G06F 3/065; G06F 3/0619; G06F 3/0673
See application file for complete search history.

(56) References Cited

U.S. PATENT DOCUMENTS

| | | | |
|---|---|---|---|
| 7,650,533 B1 | 1/2010 | Saxena et al. | |
| 8,046,547 B1 | 10/2011 | Chatterjee et al. | |
| 8,195,623 B2 * | 6/2012 | Prahlad | G06F 16/22 707/679 |
| 8,200,638 B1 | 6/2012 | Zheng et al. | |
| 9,454,587 B2 | 9/2016 | Lyons et al. | |
| 9,495,370 B1 | 11/2016 | Chatterjee et al. | |
| 2008/0307000 A1 * | 12/2008 | Paterson | G06F 11/1448 |
| 2013/0290262 A1 | 10/2013 | Yazawa et al. | |
| 2014/0279900 A1 | 9/2014 | Gupta et al. | |
| 2016/0117228 A1 | 4/2016 | Farlee et al. | |
| 2016/0154710 A1 | 6/2016 | Wade et al. | |
| 2017/0090688 A1 * | 3/2017 | Anderson | G06F 9/45558 |
| 2020/0193388 A1 | 6/2020 | Tran-Kiem et al. | |

FOREIGN PATENT DOCUMENTS

| | | |
|---|---|---|
| IN | 107608825 A | 1/2018 |
| JP | 5952631 B2 | 8/2016 |

OTHER PUBLICATIONS

"Storage Environment Snapshot and Recovery Method", Anonymous, IP.com, IP.com No. IPCOM000208538D, dated Jul. 12, 2011, pp. 6.

* cited by examiner

*Primary Examiner* — Jason W Blust
(74) *Attorney, Agent, or Firm* — Konrad, Raynes, Davda & Victor LLP; David W. Victor

(57) ABSTRACT

Provided are a computer-implemented method, system, and computer program product for multidimensional data recover. A snapshot restore request is received with at least one parameter defining at least one dimension for data recovery. At least one snapshot is reconstructed from a single continuous snapshot stream taken for a certain period of time based on the at least one parameter. A selected snapshot is received for data recovery selected from the at least one reconstructed snapshot. The selected snapshot is restored.

20 Claims, 7 Drawing Sheets

MULTI-DIMENSIONAL DATA RECOVERY

BACKGROUND

The present application relates to computing, and more specifically, to methods, systems and computer program products for snapshot-based data recovery.

Snapshot-based data recovery is a widely-adopted data backup/restore approach in digital computing. A snapshot backup is a type of backup copy used to create the entire architectural instance/copy of an application, disk or system and is used in backup processes to restore the system or disk of a particular device at a specific time. Snapshot backups are primarily used to restore a system, virtual machine and disk or drive to an operational state and to serve as the system's restore point when the snapshot was taken. It is not equivalent to a backup copy and it doesn't store the data itself but just defines where and how the data was stored and organized. Typically, a snapshot is created by using disk/system imaging or system restoration and recovery software. However, most backup software can also take snapshot backups and restore the system using the snapshots.

With digital computing entering a cloud era, there is a need to further develop the widely-adopted snapshot-based data recovery approach to better fit cloud environments.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for data recovery are described.

One example embodiment provides a computer-implemented method comprising receiving, by one or more processing units, a snapshot restore request with at least one parameter defining at least one dimension for data recovery. The method further comprises reconstructing, by one or more processing units, at least one snapshot from a single continuous snapshot stream taken for a certain period of time based on the at least one parameter. The method further comprises receiving, by one or more processing units, a selection of snapshot(s) for data recovery selected from the at least one reconstructed snapshot. The method further comprises instructing, by one or more processing units, a restoration of the received selection of snapshot(s).

Another example embodiment provides a computer-implemented system, comprising a processor and a memory medium, coupled to the processor and comprising program instructions. The program instructions comprising program instructions configured to receive a snapshot restore request with at least one parameter defining at least one dimension for data recovery. The program instructions further comprise program instructions configured to reconstruct at least one snapshot from a single continuous snapshot stream taken for a certain period of time based on the at least one parameter. The program instructions further comprise program instructions configured to receive a selection of snapshot(s) for data recovery selected from the at least one reconstructed snapshot. The program instructions further comprise program instructions configured to instruct a restoration of the received selection of snapshot(s).

A computer program product is also provided.

These and other features and advantages will be described in, or will become apparent to those of ordinary skill in the art in view of, the following detailed description of the example embodiments of the present disclosure.

BRIEF DESCRIPTION OF THE DRAWINGS

The following detailed description, given by way of example and not intended to limit the disclosure solely thereto, will best be appreciated in conjunction with the accompanying drawings, in which.

The drawings are not necessarily to scale. The drawings are merely schematic representations, not intended to portray specific parameters of the disclosure. The drawings are intended to depict only typical embodiments of the disclosure. In the drawings, like numbering represents like elements.

DETAILED DESCRIPTION

Figure 1:
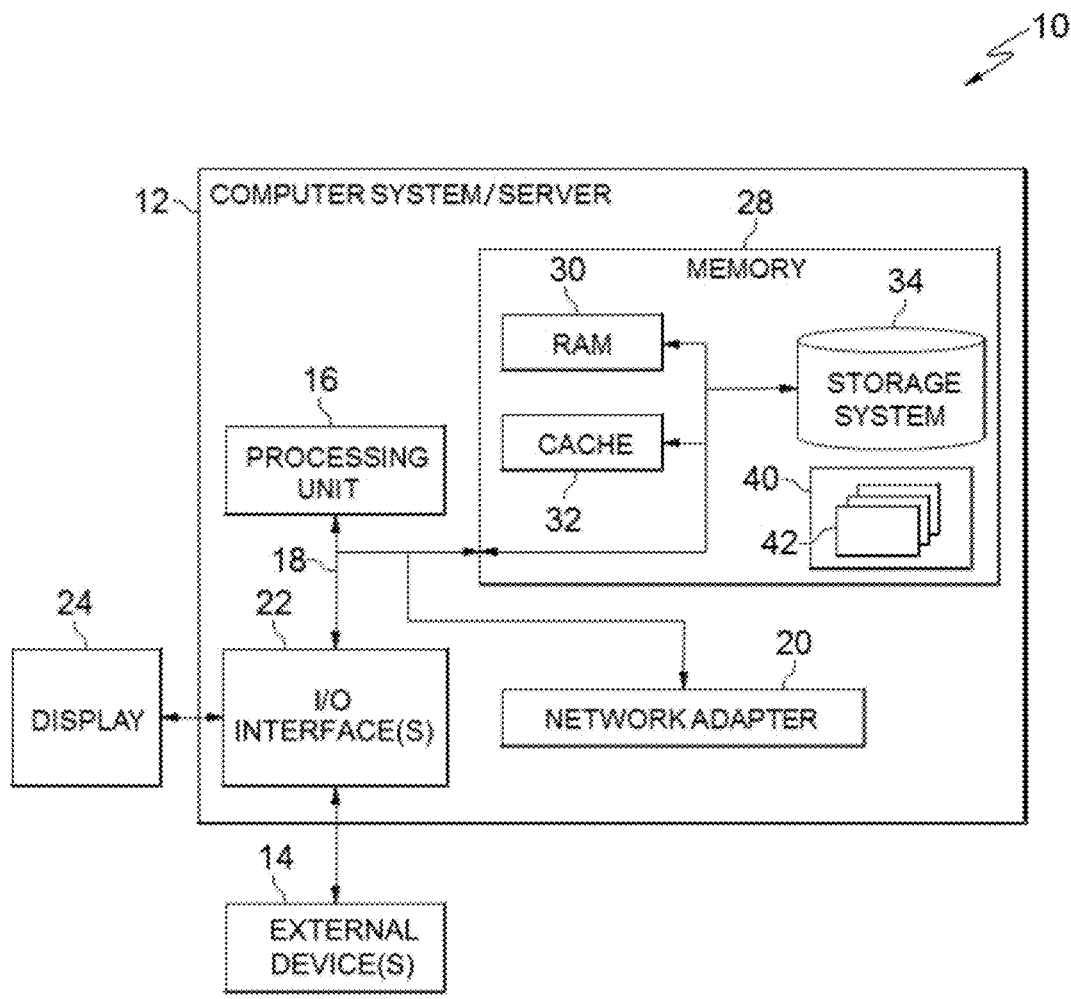
FIG. 1 depicts a cloud computing node according to an embodiment of the present disclosure.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Embodiments of the present disclosure may be implemented with, however not limited to, a cloud computing environment which will be described in the following.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to an embodiment of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
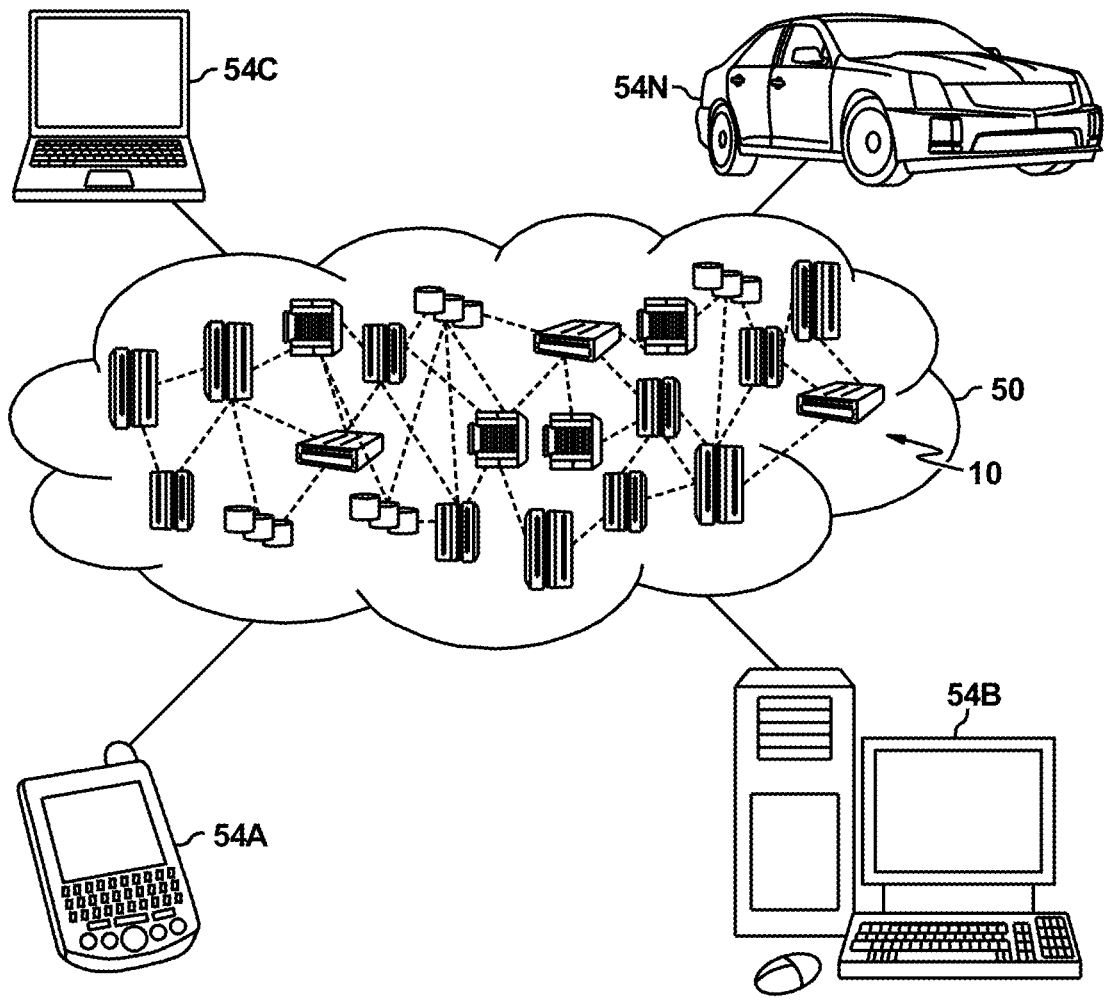
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
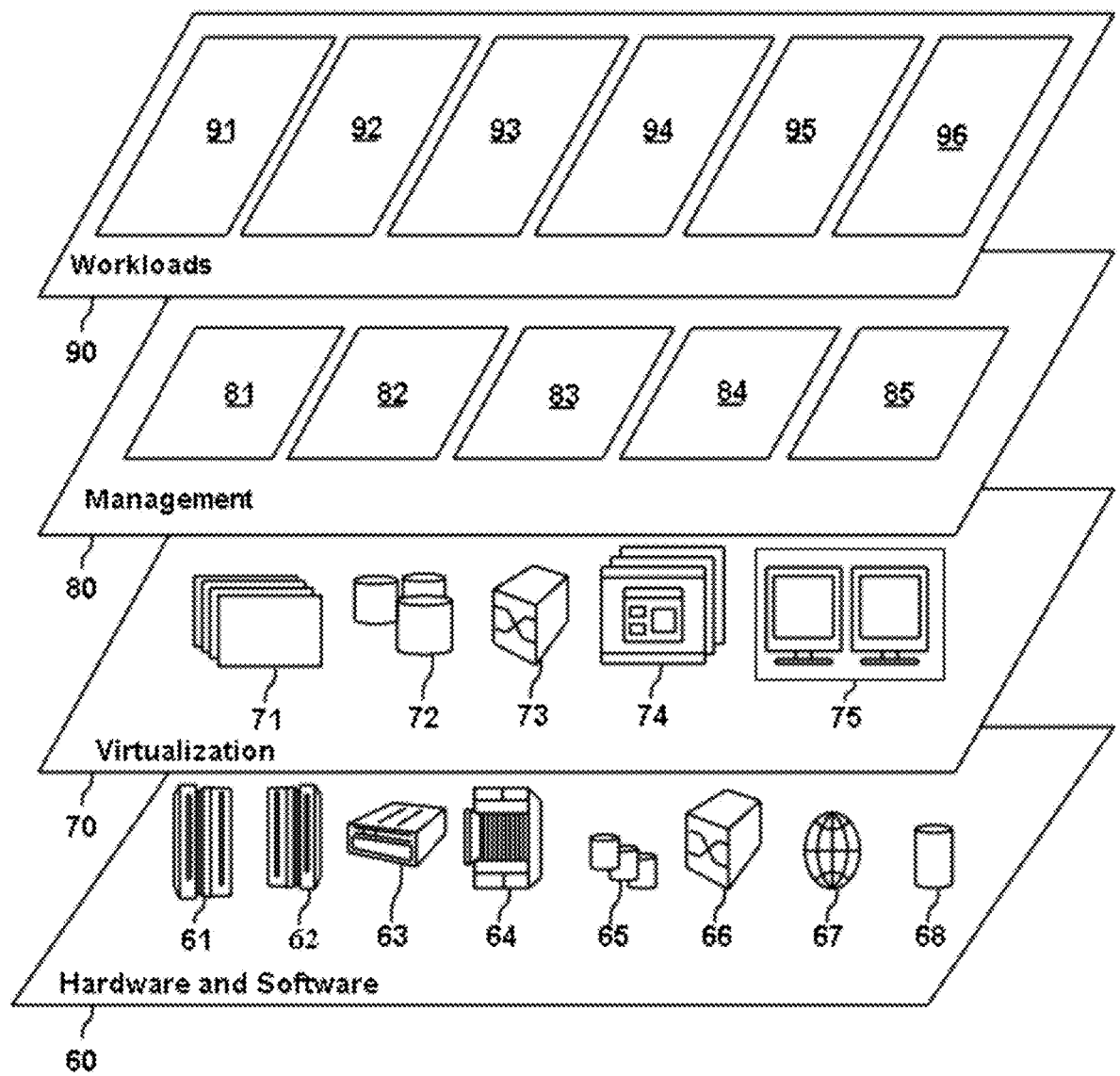
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and data recovery 96 according to embodiments of the disclosure.

Figure 4:
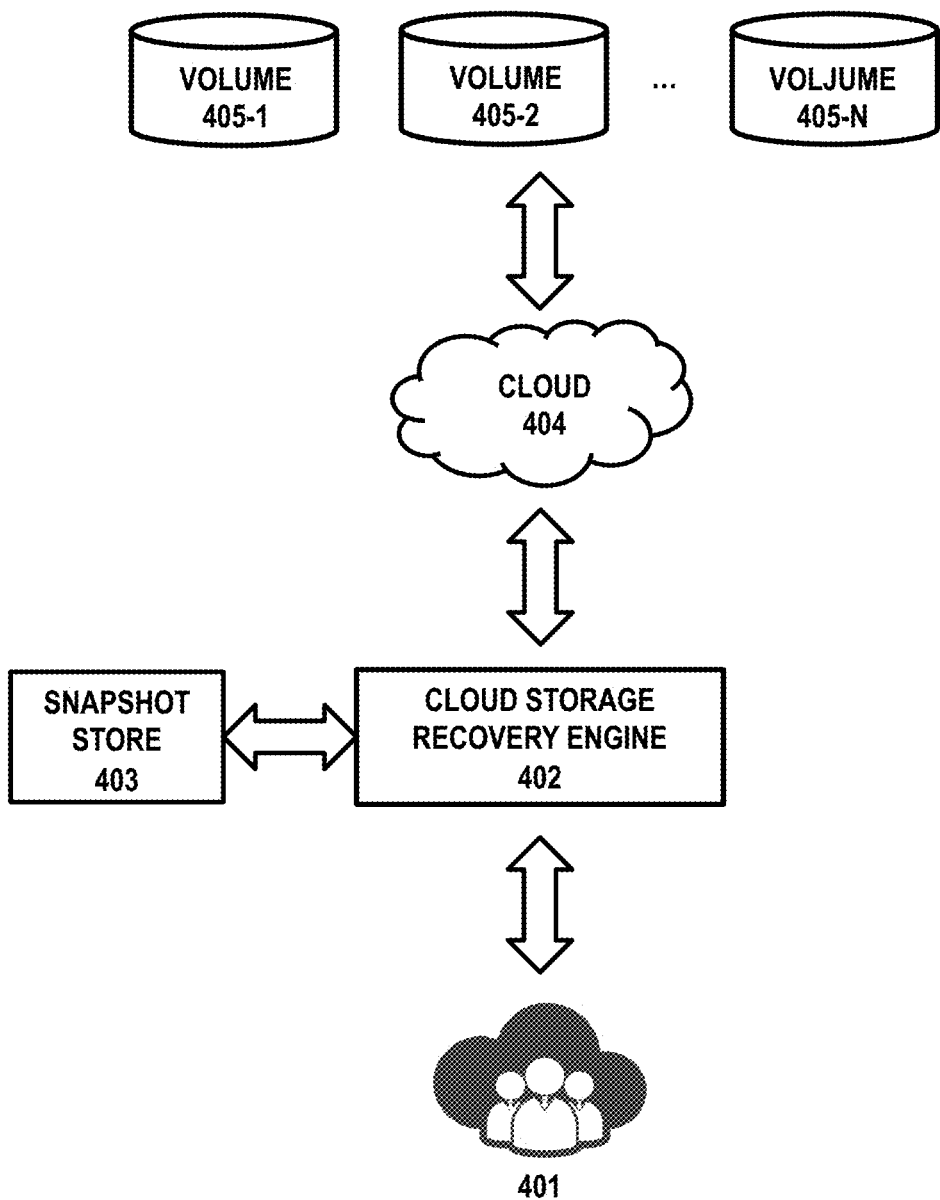
FIG. 4 depicts a block diagram of an exemplary system 400 according to an embodiment of the present disclosure.

Referring now to FIG. 4 which depicts a block diagram of an exemplary system 400 according to an embodiment of the present disclosure. As illustrated in FIG. 4, it is shown that a plurality of volumes 405-1, 405-2, . . . , 405-N are coupled to the cloud 404. The plurality of volumes 405-1, 405-2, . . . , 405-N may be any types of persistent storage associated with stateful applications such as databases—that are designed to survive independently of and remain available beyond the life of a running instance. The plurality of volumes 405-1, 405-2, . . . , 405-N may be used for any data that needs to be reused. Reuse can be either by different instances or beyond the life of a specific instance. For example, for containers, the OpenStack object storage service (openstack-swift) is a fully distributed storage solution that can be used to store any kind of static data or binary object, such as media files, large datasets, and disk images. The solution organizes these objects by using containers. Although a volume's contents can only be accessed through instances, the objects inside a container can be accessed through the object storage REST API. Therefore, the object storage can be used as a repository by almost every service in a public or private cloud. Another example is Kubernetes, in which OpenShift is a platform-as-a-service (PaaS) offering that is built around Docker container packaging and uses Kubernetes to orchestrate containerized application deployments across a cluster. In order to access storage volumes, they need to be pre-provisioned and manually registered as PersistentVolume (PV) objects before they could be consumed by an application. PersistentVolumes are resources in the cluster that have a lifecycle independent of any individual pod that uses a PersistentVolume. This is a "physical" volume on the host machine that stores persistent data. PersistentVolumes provide storage resources in a cluster, allowing the storage resource to persist even when the pods that use them are cycled. PersistentVolumes can be statically or dynamically provisioned, and they can be customized for use by defining properties such as performance, size, and access mode. In the following description of the disclosure, PersistentVolumes used in Kubernetes will be used as an example of volume 405-1, 405-2, . . . , 405-N, however, it should be pointed out it is merely for the purpose of illustration thus will not adversely limit the scope of the invention.

Also coupled to the cloud 404, is a cloud storage recovery engine 402 according to an embodiment of the present disclosure. The cloud storage recovery engine 402 provides a snapshot-based fine-grained data recovery service with the multi-dimensional query capabilities, which will be described in detail with reference to FIG. 5 to FIG. 7 later in the disclosure. The cloud storage recovery engine 402 may be integrated with existing cloud storage recovery services provided by the cloud 404, or coupled to which as an independent module. A snapshot store 403, as illustrated in FIG. 4, coupled to the cloud storage recovery engine 402, stores snapshots generated by the cloud storage recovery engine 402. Also, the snapshot store 403 is shown as an independent component in FIG. 4, and it may be local to the cloud storage recovery engine 402, or reside in any of the plurality of volumes 405-1, 405-2, . . . , 405-N which may be easily accessed by the cloud storage recovery engine 402.

A user 401 of the cloud storage recovery engine 402, typically storage administrators, may access the engine and conduct an aforementioned multi-dimensional snapshot query provided by the engine. After receiving returned results of the query from the cloud storage recover engine 402, the user 401 may instruct the cloud storage recover engine 402 to restore a snapshot selected from the returned results.

It should be pointed out that although it is depicted with the illustration of the exemplary system 400 in FIG. 4, it is merely for the purpose of schematic illustration, other illustration may be adopted without departing the spirit of the disclosure, for example, the plurality of volumes 405-1, 405-2, . . . , 405-N may be illustrated as a storage cloud providing persistent storage; the cloud 404, the cloud storage recovery engine 402 and the snapshot 403 may be illustrated together as a cloud computing environment couple to the storage cloud.

Figure 5:
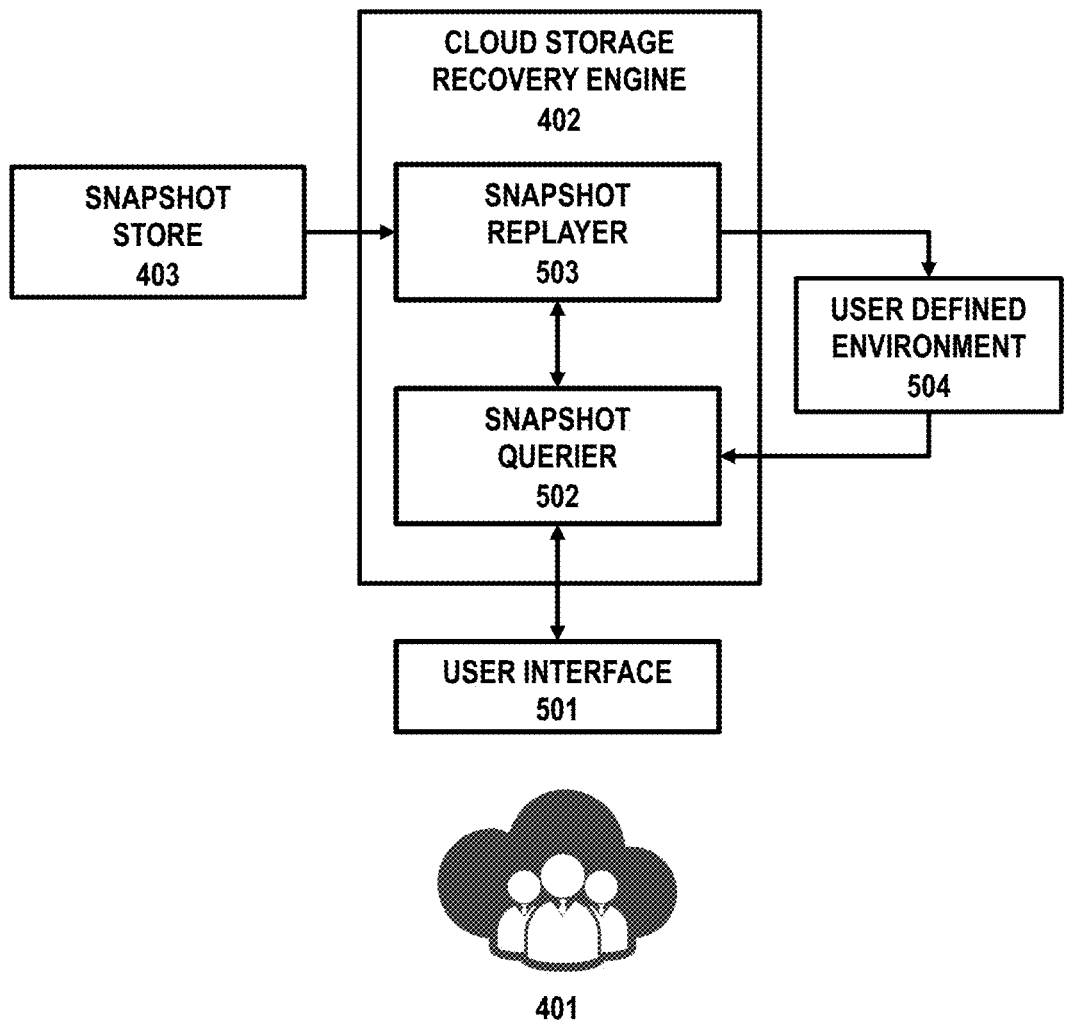
FIG. 5 depicts an exemplary detailed block diagram of the cloud storage recovery engine 402 of FIG. 4 according to an embodiment of the present disclosure.

In the following, the cloud storage recovery engine 402 will be described in detail with reference to FIG. 5, which depicts an exemplary detailed block diagram of the cloud storage recovery engine 402 of FIG. 4 according to an embodiment of the present disclosure. In FIG. 5, the snapshot store 403 and the user 401 are corresponding to those in FIG. 4, and will not be described for brevity.

Now referring to FIG. 5, the cloud storage recovery engine 402 is coupled to a user interface 501 (which may or may not be part of the cloud storage recovery engine 402) that provides easy access of the services provided by the cloud storage recovery engine 402 to users 401 of the cloud storage recovery engine 402. The user interface 501 may be in the form of a command line interface (CLI), a graphic user interface (GUI), or any other types of user interfaces for easy operation of the cloud storage recovery engine 402 to users 401. The user interface 501 may receive a multi-dimensional snapshot query (e.g., in the format of a command line command, or via a mouse click event) from a user 401 and pass it on to the cloud storage recovery engine 402. In the following, the multi-dimensional snapshot query will be described as a snapshot restore request because typically when a storage administrator initiates a snapshot restore request, a query on saved snapshots will be conducted according to an embodiment of the present disclosure, however it should be pointed out that a snapshot query which may not result in an actual restoration of a snapshot may also be possible according to another embodiment of the present disclosure, therefore the snapshot restore request should be interpreted to include both the scenarios.

Embodiments of the present disclosure are targeting to provide a snapshot-based fine-grained data recovery service, in which 'fine-grained' means the snapshot-based data recovery service may provide multi-dimensional query capabilities. According to an embodiment of the present disclosure, in order to provide such capabilities, the snapshot restore request may be with at least one parameter which defines at least one dimension. The at least one parameter in the snapshot recovery request, according to an embodiment of the present disclosure, may comprise for example 1) time parameter, which may be a specific time point or a certain time range, etc., 2) data parameter, which may be a specific data, a specific type of data, or a certain range of a specific data, etc., 3) metadata parameter, which may be a specific metadata, a certain type of a specific metadata, or a certain range of a specific metadata, etc., 4) application parameter, which may be a specific application, or a specific type of application, etc., or 5) Input/Output (I/O) operation parameter, which may be a certain distribution of a certain type of I/O operation. It should be pointed out that the above parameter list is not a full list and is merely for purpose of illustration, any other types of parameters may be adopted so long as they can be used to retrieve snapshots from the snapshot store 403. According to an embodiment of the present disclosure, the at least one parameter may be encoded in corresponding pre-defined data fields of the snapshot restore request such that they can be easily retrieved by reading the corresponding data fields.

The above parameters listed indicate the capabilities of multi-dimensional query provided by the cloud storage recovery engine 402, with each parameter indicating a corresponding dimension, i.e., 1) time dimension, which may include time point sub-dimension and time range sub-dimension, etc., 2) data dimension, which may include data sub-dimension, data type sub-dimension and data range sub-dimension, etc., 3) metadata dimension, which may include metadata sub-dimension, metadata type sub-dimension and metadata range sub-dimension, etc., 4) application dimension, which may include application sub-dimension and application type sub-dimension, etc., and 5) I/O operation dimension, which may include I/O distribution sub-dimension. Compared with time point being the only dimension provided in existing arts, the cloud storage recovery engine 402 according to embodiments of the present disclosure provides data recovery service by the respective dimensions mentioned above. Corresponding, it should be pointed out that the above dimension list is not a full list and is merely for purpose of illustration, any other types of dimensions may be adopted so long as the corresponding parameters can be used to retrieve snapshots from the snapshot store 403.

The cloud storage recovery engine 402 may comprise a snapshot querier 502 and a snapshot replayer 503. The snapshot querier 502, according to an embodiment of the present disclosure, is configured to receive the snapshot restore request from the user 401 via the user interface 501 and parse the received snapshot restore request to retrieve the at least one parameter from it. According to an embodiment of the present disclosure, the snapshot querier 502 may retrieve the at least one parameter from, for instance, corresponding pre-defined data fields of the snapshot restore request. The snapshot querier 502 then passes the retrieved at least one parameter to the snapshot replayer 503. The snapshot replayer 503, according to an embodiment of the present disclosure, is configured to reconstruct at least one snapshot from a single continuous snapshot stream taken for a certain period of time. The single continuous snapshot stream may be retrieved from the snap store 403. According to an embodiment of the present disclosure, for a certain persistent storage in focus (for example, volume 405-1, 405-2, . . . or 405-N), only one single continuous snapshot stream is taken for a certain period of time (for example, for 20 minutes), which is different from the approach in existing arts where multiple snapshots are taken at each corresponding time points for the persistent storage. A snapshot typically does not store the data itself, but defines where and how the data was stored and organized. A single continuous snapshot stream will define where and how the data was stored and organized for the period of time for which the snapshot was taken, that is to say, and will record the changes of the data along the period of time for which the snapshot was taken. According to an embodiment of the present disclosure, the cloud storage recovery engine 402 may instruct to take the single continuous snapshot stream and store it in the snapshot store 403. With a single continuous snapshot stream, for a certain period of time (e.g., instructed by the cloud storage recovery engine 402), only one single continuous snapshot stream is taken, rather than multiple snapshots are taken at each corresponding time point.

According to an embodiment of the present disclosure, the snapshot replayer 503 may be configured to determine at least one dimension defined by the at least one parameter. According to an embodiment of the present disclosure, the at least one dimension may be determined by corresponding at least one pre-defined data fields of the snapshot restore request. The snapshot replayer 503 may then be configured to reconstruct at least one snapshot from a single continues snapshot for the determined at least one dimension. Then the snapshot replayer 503 may be configured to apply the at least one parameter received from the snapshot querier 502 to the reconstructed at least one snapshot to verify whether the at least one reconstructed snapshot for the at least one dimension is sufficient. If the reconstructed at least one snapshot is insufficient, the snapshot replayer 503 may be further configured to reconstruct further snapshot(s) for the at least one dimension. Then, the snapshot replayer 503 may be configured to apply again the at least one parameter and verify whether the reconstructed at least one snapshot and the further snapshot(s) are sufficient. The at least one parameter retrieved from the snapshot restore request received from the user 401 functions as a filter to verify whether snapshots reconstructed by the snapshot replayer 503 are sufficient with respect to the corresponding at least one dimension. The reconstruction and verification may be executed until it is determined that the reconstructed snapshots are sufficient. The snapshot replayer 503 then passes the results to the snapshot querier 502, and further to the user 401 via the user interface 501. Responsive to a selection of snapshot(s) for data recovery selected from the returned results (the at least one reconstructed snapshot) is received from the user 401 via the user interface 501, the cloud storage recovery engine 402 may instruct the restoring of the received selection of snapshot(s).

According to an embodiment of the present disclosure, before returning the results to the snapshot querier 502, the snapshot replayer 503 may first send the results to a user defined environment 504, e.g., a container environment, for preview. According to an embodiment of the present disclosure, the snapshot replayer 503 may attach the reconstructed snapshots in a read-only mode to a (user defined) container to restore data, providing the result of the restoring via the user interface 501 such that the user 401 may check whether the restore of data is as expected. Responsive to a selection of snapshot(s) for data recovery selected from the results being previewed is received from the user 401 via the user interface 501, the cloud storage recovery engine 402 may instruct the restoring of the received selection of snapshot(s). The restoring of data executed in a user defined environment 504 first rather than directly in production environment is beneficial as it provides a 'preview' function to the user 401 without actually restoring data. This can make sure correct snapshots are selected by the user 401 to restore data. The user defined environment 504 may be pre-configured by the user 401 and couple to the cloud storage recovery engine 402 dynamically upon the snapshot restore request initiated by the user 401.

Figure 6:
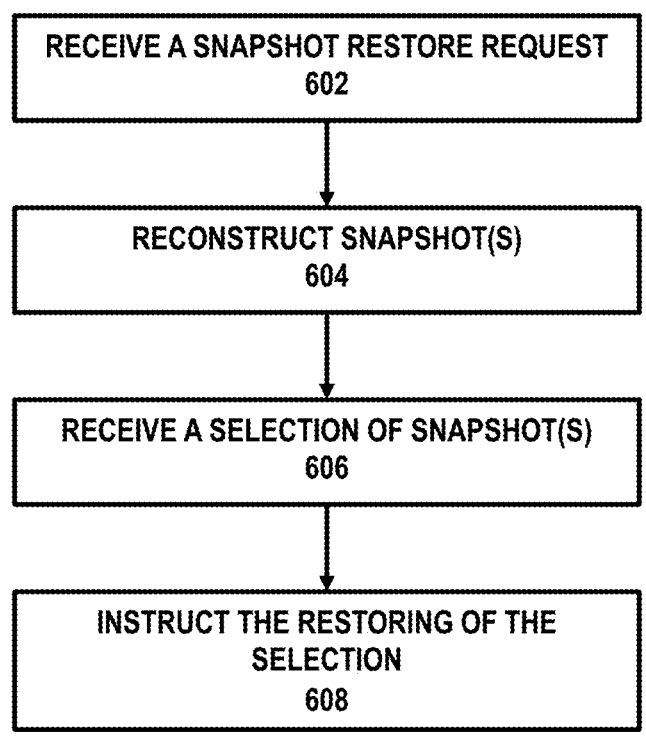
FIG. 6 depicts a flowchart of an exemplary method 600 according to an embodiment of the present disclosure.

Now referring to FIG. 6, in which a flowchart of an exemplary method 600 according to an embodiment of the present disclosure is depicted. The method 600 may be implemented, for example, in the system 400 of FIG. 4, with the cloud storage recovery engine 402.

At Step 602, a snapshot restore request is received, for example, by the cloud storage recovery engine 402 from a user 401 (typically a storage administrator) via the user interface 501. According to an embodiment of the present disclosure, the snapshot restore request is with at least one parameter which defines at least one dimension. The at least one parameter in the snapshot recovery request, according to an embodiment of the present disclosure, may comprise for example 1) time parameter, 2) data parameter, 3) metadata parameter, 4) application parameter, or 5) Input/Output (I/O) operation parameter. The at least one parameter may be encoded in corresponding pre-defined data fields of the snapshot restore request.

At Step 602, responsive to receiving the snapshot restore request, at least one snapshot is reconstructed from a single continuous snapshot stream taken for a certain period of time based on the at least one parameter, for example, by the cloud storage recovery engine 402. According to an embodiment of the present disclosure, for a certain persistent storage in focus (for example, volume 405-1, 405-2, . . . or 405-N in FIG. 4), only one single continuous snapshot stream is taken for a certain period of time (for example, for 20 minutes), rather than multiple snapshots are taken at each corresponding time point. A single continuous snapshot stream records the changes of the data along the period of time for which the snapshot was taken. According to an embodiment of the present disclosure, the single continuous snapshot stream may be retrieved from a snapshot store (e.g., the snapshot store 403 in FIG. 4 and FIG. 5).

At Step 606, a selection of snapshot(s) for data recovery selected from the at least one reconstructed snapshot is received, for example, by the cloud storage recovery engine 402 via the user interface 501. The selection of snapshot(s) for data recovery is selected from the reconstructed at least one snapshot, which is reconstructed from a single continuous snapshot stream taken for a certain period of time based on the at least one parameter encoded in the snapshot restore request.

At Step 608, the restoring of the received selection of snapshot(s) is instructed, for example, by the cloud storage recovery engine 402.

According to an embodiment of the present disclosure, the at least one reconstructed snapshot is sent to a user defined environment for preview before being returned as results (not shown in FIG. 6). According to an embodiment of the present disclosure, the at least one reconstructed snapshot is attached in a read-only mode to the user defined environment to restore data, then the result of the restoring is provided such that whether the restore of data is as expected is checked. Responsive to a selection of snapshot(s) for data recovery selected from the at least one reconstructed snapshot being previewed is received, the restoring of the received selection of snapshot(s) may be instructed, for example, by the cloud storage recovery engine 402 (not shown in FIG. 6).

Figure 7:
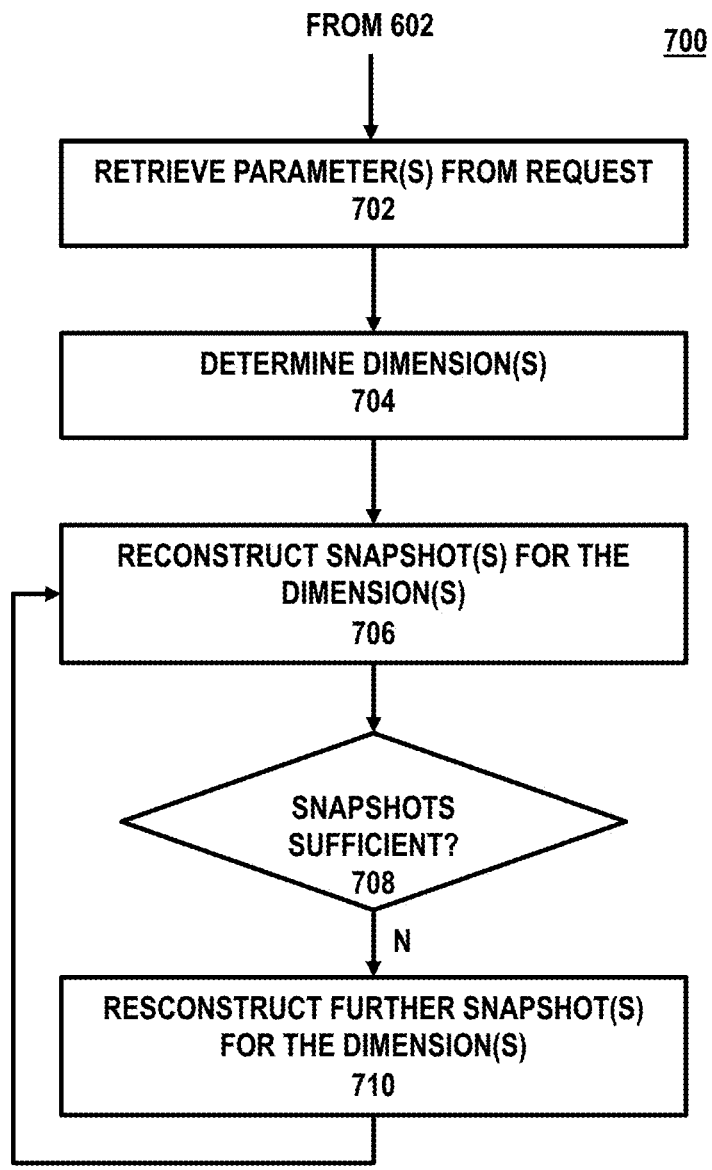
FIG. 7 depicts a flowchart of another exemplary method 700 according to an embodiment of the present disclosure.

In the following, reference will be made to FIG. 7, which depicts a flowchart of another exemplary method 700 according to an embodiment of the present disclosure. FIG. 7 depicts details of reconstructing the at least one snapshot from a single continuous snapshot stream taken for a certain period of time based on the at least one parameter.

At Step 702, the at least one parameter is retrieved from the received snapshot restore request, for example, by the cloud storage recovery engine 402 responsive the receipt of the snapshot restore request, for example at Step 602 of FIG. 6. According to an embodiment of the present disclosure, the at least one parameter may be retrieved from, for instance, corresponding pre-defined data fields of the received snapshot restore request.

At Step 704, the at least one dimension defined by the at least one parameter is determined, for example, by the cloud storage recovery engine 402. According to an embodiment of the present disclosure, the at least one dimension may be determined by corresponding at least one pre-defined data fields of the snapshot restore request.

At Step 706, at least one snapshot for the determined at least one dimension is reconstructed from a single continues snapshot, for example, by the cloud storage recovery engine 402.

At Step 708, it is determined whether the reconstructed at least one snapshot is sufficient. According to an embodiment of the present disclosure, the at least one parameter is applied to the reconstructed at least one snapshot to verify whether the at least one reconstructed snapshot for the at least one dimension is sufficient.

At Step 710, if the reconstructed at least one snapshot is insufficient, further snapshot(s) for the at least one dimension may be further reconstructed. Then the method goes back to Step 708, where it is determined again whether the reconstructed snapshots are sufficient. The at least one parameter retrieved from the snapshot restore request functions as a filter to verify whether reconstructed snapshots are sufficient with respect to the corresponding at least one dimension. The reconstruction and verification may be executed until it is determined that the reconstructed snapshots are sufficient.

Embodiments of the present disclosure have been described in the above. It should be noted that the data recovery according to embodiments of this disclosure could be implemented by computer system/server 12 of FIG. 1.

Embodiments of the present disclosure may be a system, a method, and/or a computer program product at any possible technical detail level of integration. The computer program product may include a computer readable storage medium (or media) having computer readable program instructions thereon for causing a processor to carry out aspects of embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present disclosure.

Aspects of embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by one or more processing units, comprising:

storing a single continuous snapshot stream taken for a period of time, wherein the single continuous snapshot stream records changes of data along for the period of time for which the single continuous snapshot stream was taken;

receiving a snapshot restore request with at least one parameter defining at least one dimension for data recovery;

reconstructing a plurality of snapshots from the single continuous snapshot stream having data sufficient for a query based on the at least one dimension in the at least one parameter in the snapshot restore request;

receiving a selection of a snapshot for data recovery selected from the reconstructed plurality of snapshots; and instructing a restoration of the selected snapshot.

2. The computer-implemented method of claim 1, wherein the reconstructing the plurality of snapshots further comprises:

retrieving the at least one parameter from the received snapshot restore request;

determining the at least one dimension based on the at least one retrieved parameter; and reconstructing the plurality of snapshots for the at least one determined dimension.

3. The computer-implemented method of claim 2, further comprising:

verifying the reconstructed plurality of snapshots for the at least one determined dimension.

4. The computer-implemented method of claim 3, further comprising:

reconstructing at least one further snapshot for the at least one determined dimension responsive to the verification of the reconstructed plurality of snapshots for the at least one determined dimension being insufficient.

5. The computer-implemented method of claim 1, further comprising:

previewing on a user interface the reconstructed plurality of snapshots, wherein the selected snapshot is received for data recovery from the previewed reconstructed plurality of snapshots.

6. The computer-implemented method of claim 5, further comprising:
executing the previewing of the reconstructed plurality of snapshots in a user defined environment.

7. The computer-implemented method of claim 1, wherein the at least one dimension is selected from a group of dimensions consisting of: time, data, metadata, application, and Input/Output (I/O) operation.

8. A system, comprising:
a processor; and
a computer readable storage medium, coupled to the processor and comprising program instructions, wherein the program instructions when executed by the processor perform operations comprising:
storing a single continuous snapshot stream taken for a period of time, wherein the single continuous snapshot stream records changes of data along for the period of time for which the single continuous snapshot stream was taken;
receiving a snapshot restore request with at least one parameter defining at least one dimension for data recovery;
reconstructing a plurality of snapshots from the single continuous snapshot stream having data sufficient for a query based on the at least one dimension in the at least one parameter in the snapshot restore request;
receiving a selection of a snapshot for data recovery selected from the reconstructed plurality of snapshots; and
instructing a restoration of the selected snapshot.

9. The system of claim 8, wherein the operations further comprise:
retrieving the at least one parameter from the received snapshot restore request;
determining the at least one dimension based on the at least one retrieved parameter; and
reconstructing the plurality of snapshots for the at least one determined dimension.

10. The system of claim 9, wherein the operations further comprise:
verifying the reconstructed plurality of snapshots for the at least one determined dimension.

11. The system of claim 10, wherein the operations further comprise:
reconstructing at least one further snapshot for the at least one determined dimension responsive to the verification of the reconstructed plurality of snapshots for the at least one determined dimension being insufficient.

12. The system of claim 8, wherein the operations further comprise:
previewing the reconstructed plurality of snapshots, wherein the selected snapshot is received for data recovery from the previewed reconstructed plurality of snapshots.

13. The system of claim 12, wherein the operations further comprise:
executing the previewing of the reconstructed plurality of snapshots in a user defined environment.

14. The system of claim 8, wherein the at least one dimension is selected from a group of dimensions consisting of: time, data, metadata, application, and Input/Output (I/O) operation.

15. A computer program product comprising a computer readable storage medium having program codes embodied therewith that when executed by a processor perform operations, the operations comprising:
storing a single continuous snapshot stream taken for a period of time, wherein the single continuous snapshot stream records changes of data along for the period of time for which the single continuous snapshot stream was taken;
receiving a snapshot restore request with at least one parameter defining at least one dimension for data recovery;
reconstructing a plurality of snapshots from the single continuous snapshot stream having data sufficient for a query based on the at least one dimension in the at least one parameter in the snapshot restore request;
receiving a selection of a snapshot for data recovery selected from the reconstructed plurality of snapshots; and
instructing a restoration of the selected snapshot.

16. The computer program product of claim 15, wherein the operations further comprise:
retrieving the at least one parameter from the received snapshot restore request;
determining the at least one dimension based on the at least one retrieved parameter; and
reconstructing the plurality of snapshots for the at least one determined dimension.

17. The computer program product of claim 16, wherein the operations further comprise:
verifying the reconstructed plurality of snapshots for the at least one determined dimension.

18. The computer program product of claim 17, wherein the operations further comprise:
reconstructing at least one further snapshot for the at least one determined dimension responsive to the verification of the reconstructed plurality of snapshots for the at least one determined dimension being insufficient.

19. The computer program product of claim 15, wherein the operations further comprise:
previewing in a user interface the reconstructed plurality of snapshots, wherein the selected snapshot is received for data recovery from the previewed reconstructed plurality of snapshots.

20. The computer program product of claim 19, wherein the operations further comprise:
executing the previewing of the reconstructed plurality of snapshots in a user defined environment.

* * * * *